Nov. 13, 1934.　　W. R. HEWTON　　1,980,527
MECHANICAL MOVEMENT
Filed Aug. 18, 1933　　5 Sheets-Sheet 1
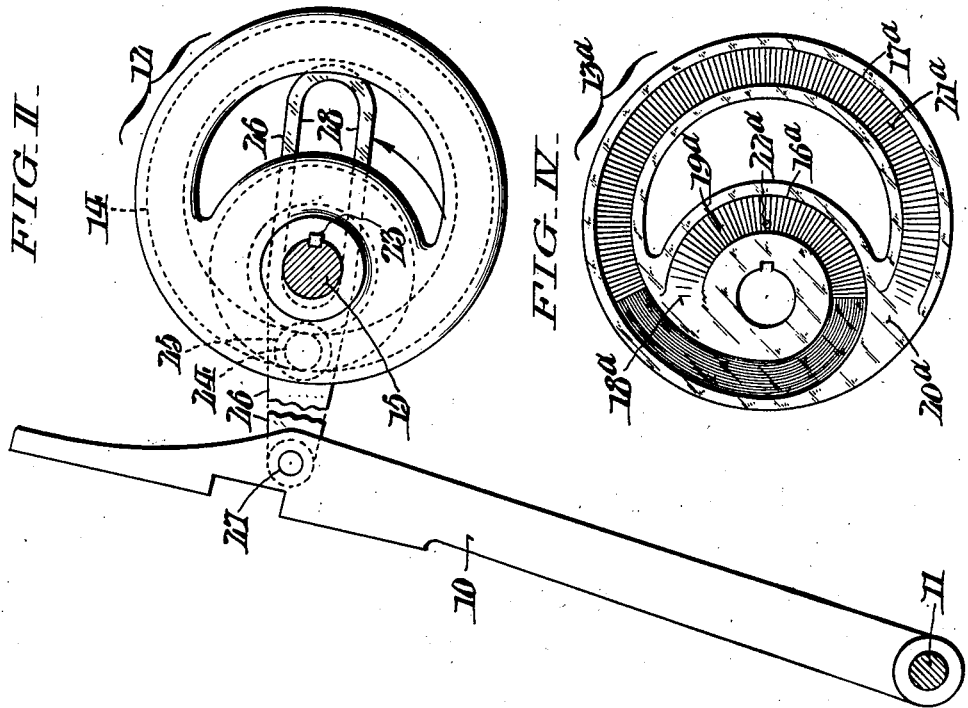
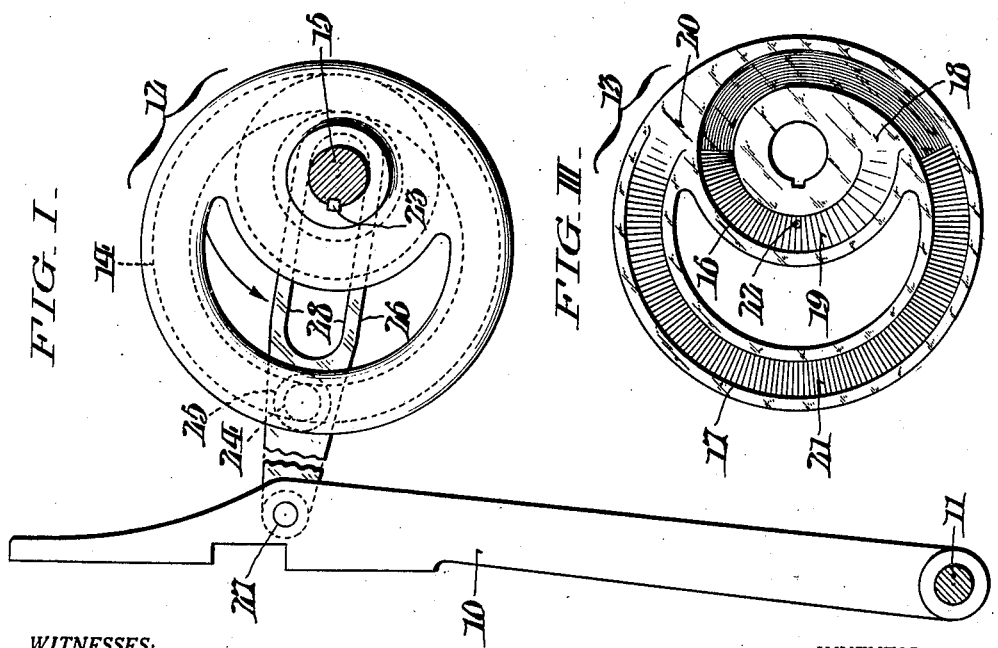
INVENTOR:
William R. Hewton Nov. 13, 1934. W. R. HEWTON 1,980,527
MECHANICAL MOVEMENT
Filed Aug. 18, 1933 5 Sheets-Sheet 2
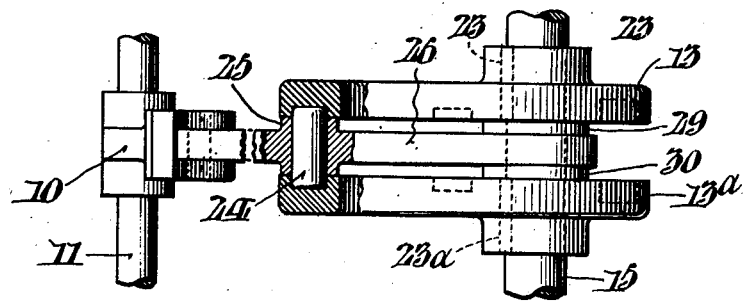
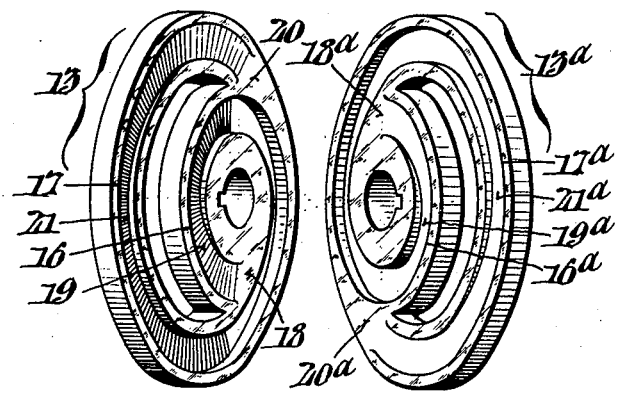
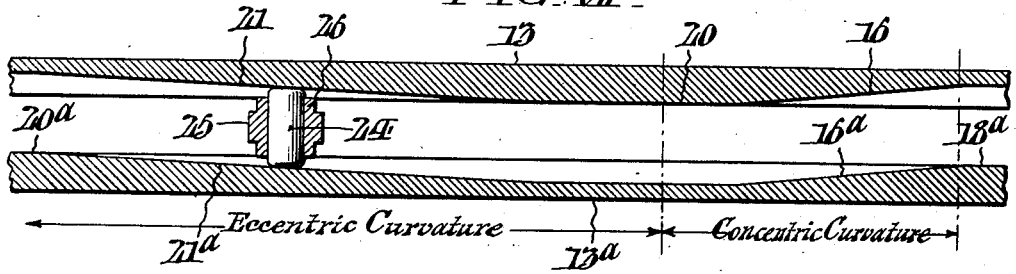

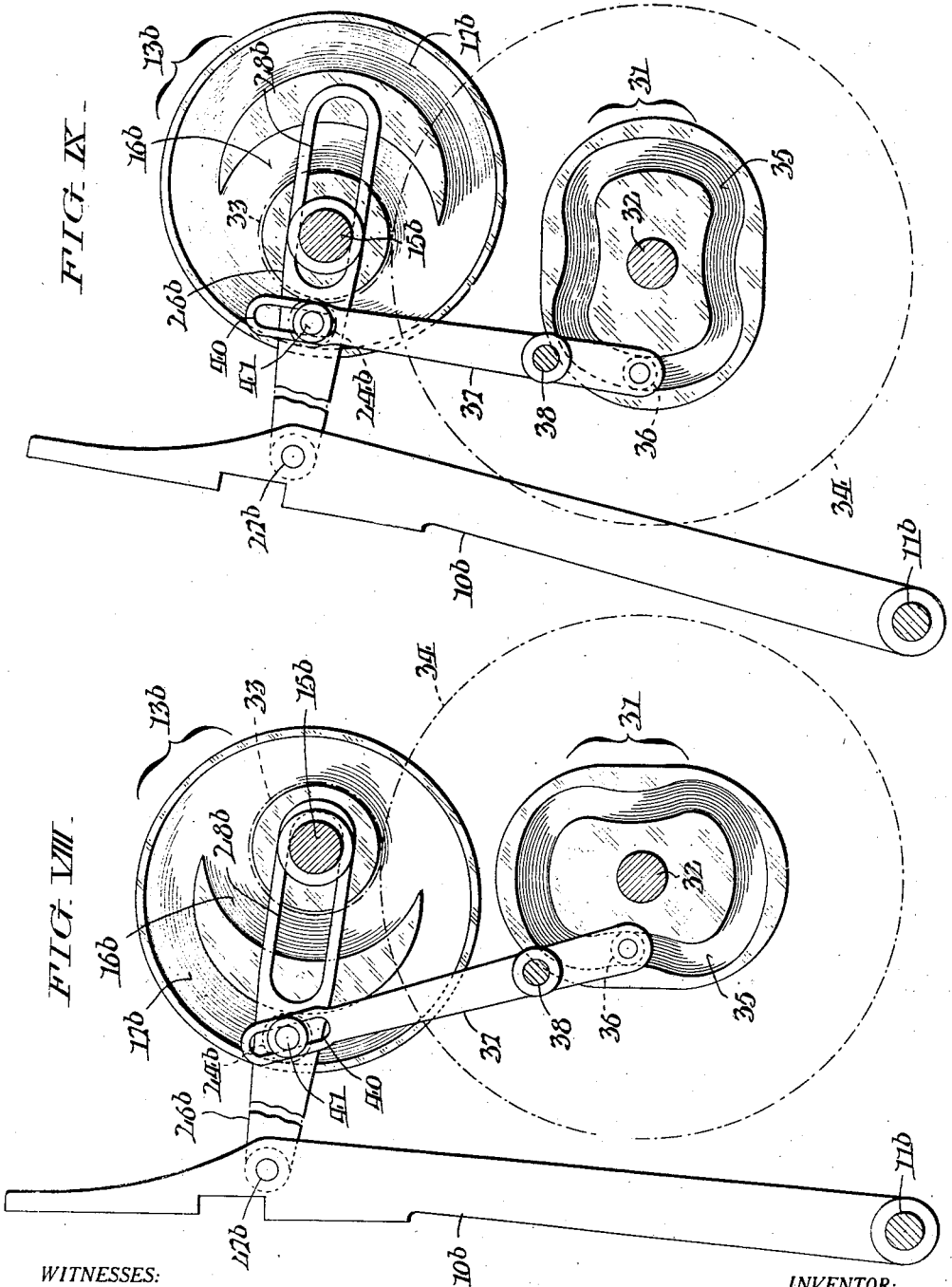

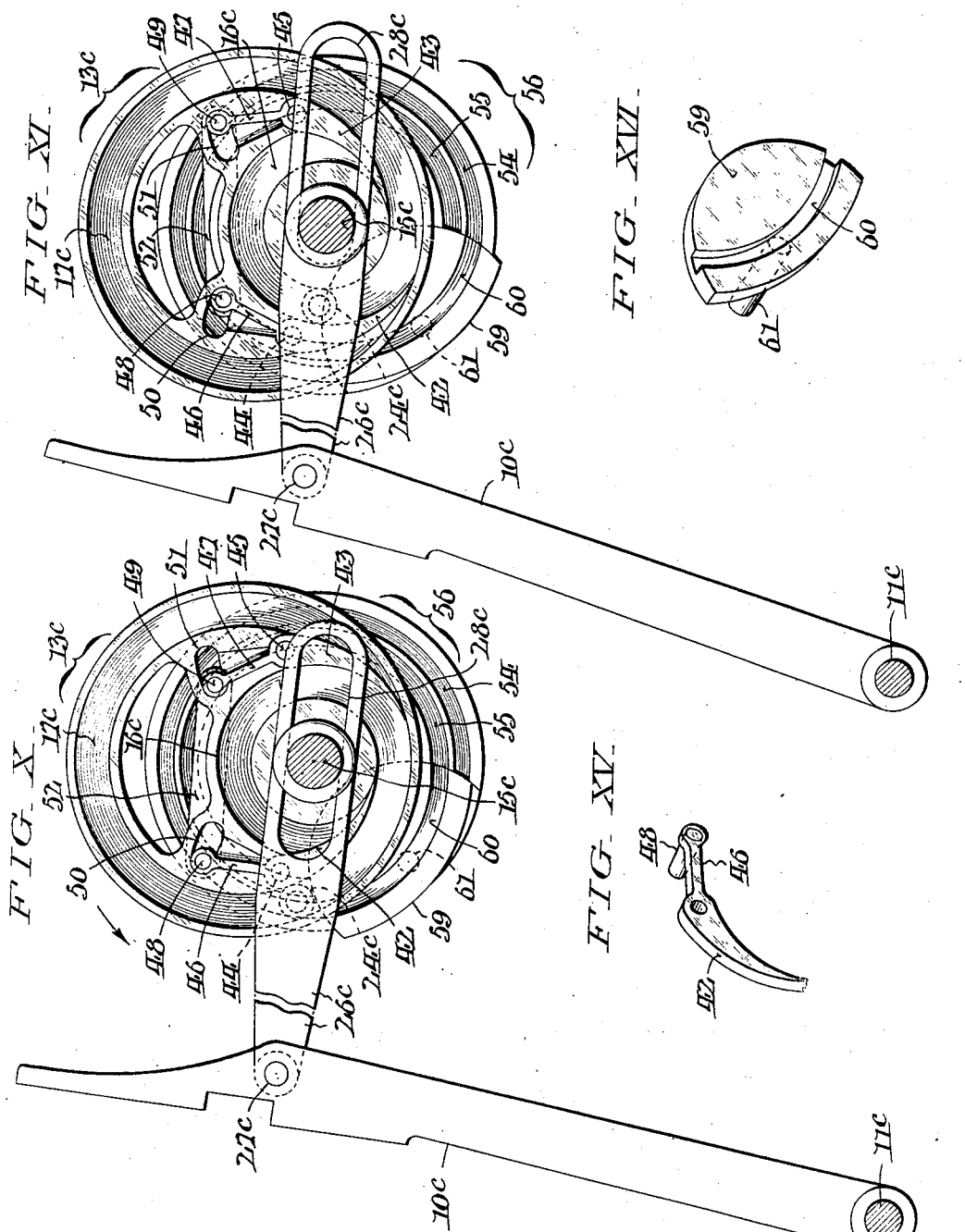

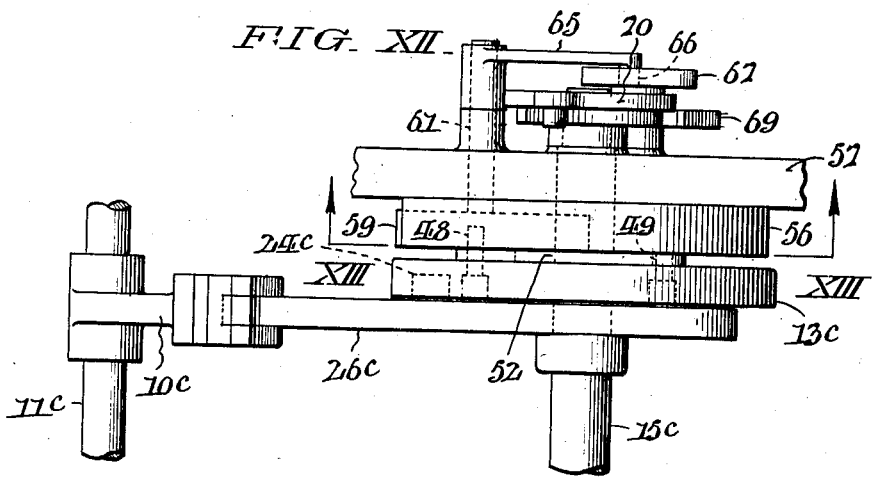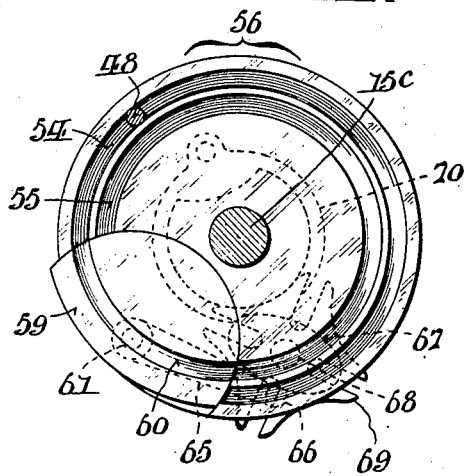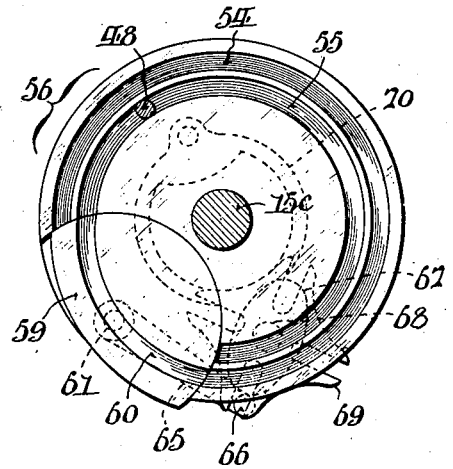

Patented Nov. 13, 1934

1,980,527

UNITED STATES PATENT OFFICE 1,980,527

MECHANICAL MOVEMENT

William R. Hewton, Philadelphia, Pa., assignor to Collins & Aikman Corporation, Philadelphia, Pa., a corporation of Delaware Application August 18, 1933, Serial No. 685,688

19 Claims. (Cl. 74—55)

This invention relates to mechanical movements; and it is concerned more specifically with means for converting rotary motion into reciprocatory motion.

Considered from the broadest aspect, my invention is directed toward making it possible to obtain reciprocatory motion from a continuously revolving shaft during predetermined revolutions thereof. This desideratum I realize in practice, as hereinafter fully disclosed, through provision of a simple and smoothly operating movement which lends itself to embodiment in a number of different forms each of which is characterized by a continuously revolving rotary cam means affording a track with mergent concentric and eccentric portions for a follower, whereby, during every other revolution of said rotary cam means, reciprocatory motion is imparted to an element coordinated with the follower.

Such a movement is useful in connection with weaving looms to actuate the lays, and I have for convenience of exemplification shown and described it herein in suitable forms for this purpose, although, as will be readily understood, it may be used in other connections where periodic reciprocatory motion is required.

When used as a lay actuating means on a loom, my novel mechanical movement produces, during alternate revolutions of a drive shaft, rapid pulses of the lay to beat up the weft, while during intervening revolutions of the shaft, the lay is permitted to remain quiescent for passage of the shuttle, to the advantage that the loom can be operated at much higher speeds than possible with the usual crank motions heretofore ordinarily employed for the indicated purpose.

Other objects and attendant advantages of this invention will be manifest from the detailed description which follows of the accompanying drawings, wherein Fig. I is a side view of one embodiment of my improved mechanical movement incorporated in a loom to operate the lay thereof which latter is shown in its forward or active position incident to beating up the weft.

Fig. II is a view corresponding to Fig. I showing the lay quiescent in its retracted idle position for passage of the shuttle.

Figs. III and IV are face views of two rotary cam disks embodied in the organization of Figs. I and II.

Fig. V is a plan view of the lay motion with portions broken away and sectioned to expose important details.

Fig. VI is a perspective view showing the relation in which the two cam disks are mounted on the driving shaft of the lay motion.

Fig. VII is a diagrammatic view showing in linear development the continuous cam track afforded by the two disks aforementioned.

Figs. VIII and IX are views similar to Figs. I and II showing an alternative embodiment of my invention.

Figs. X and XI are views corresponding substantially to Figs. I and II and to Figs. VIII and IX and showing still another embodiment of my invention.

Fig. XII is a plan view with the parts positioned as shown in Fig. X.

Fig. XIII is a sectional view taken as indicated by the arrows XIII—XIII in Fig. XII.

Fig. XIV is a view like Fig. XIII with the parts in different positions.

Figs. XV and XVI are perspective views of switch members forming parts of the organization depicted in Figs. X and XI.

Referring in greater detail first more particularly to Figs. I—VII of these illustrations, the numeral 10 designates one of the swords of a lay of the loom, which sword is secured to a shaft 11 with capacity for being reciprocated in the usual way.

The novel mechanical movement which I have devised for imparting movement to periodic motion—in this instance to the lay of the loom— comprises a rotary cam means 12 formed by a pair of cam disks 13 and 13a. As shown, these disks 13 and 13a are mounted on a shaft 15 which takes the place of the usual crank shaft of the loom, and which is caused to revolve twice for each throw of the shuttle by suitable mechanism not illustrated. The disk 13, it will be noted from Fig. III, has an interrupted side face groove with a concentric portion 16 of relatively small radius curvature and a mergent eccentric portion 17 of larger radius curvature. As shown in Figs. III—VI, the concentric groove portion 16 vanishes into the side face of the cam disk 13 at 18 through an incline 19 comprehending approximately 180 circular degrees with relation to the axis of the shaft 15. The eccentric groove portion 17 similarly vanishes into the side face of the cam disk 13 at 20 diametrically opposite the region 18 through an incline 21 comprehending approximately 135 circular degrees with regard to the eccentric center 22. The companion disk 13a is an exact counterpart of the cam disk 13, it having an interrupted side face groove with small radius curvature and large radius curvature concentric and eccentric portions 16a and 17a respectively corresponding to the concentric and eccentric groove portions 16 and 17 of said cam disk 13. Also similarly, the concentric and eccentric groove portions 16a and 17a vanish into the side face of the disk 13a through inclines 19a and 21a having arcuate extents corresponding exactly to those of the inclines 19 and 21 of the disk 13. The two disks 13 and 13a it will be noted are set upon the shaft 15 in the relation shown in Fig. VI, so that their grooves coincide, with the inclines 19, 19a and 21, 21a lying directly opposite each other, and with the plain vanishing surfaces 18 and 20 opposite the deep portions of the groove in the disk 13a and vice versa. This relationship is clearly brought out in Fig. VII. Any suitable means such as keys 23, 23a may be employed to secure the disks 13, 13a to the shaft 15. By virtue of the described construction and arrangement, the disks 13 and 13a jointly provide a continuous track 14 (Figs. I and II) for a follower in the form of a roller 24 which is carried with capacity for lateral shifting in a boss 25 (Fig. V) of a link 26. At its forward end, this link 26 has a pivotal connection 27 with the lay sword 10 as shown in Figs. I and II, the rear end of said link being slotted as at 28 for confinement to endwise movement by the shaft 15. A pair of collars 29 and 30 free on the shaft 15 maintain the link 26 centralized between the cam disks 13 and 13a as shown in Fig. V. Incident to rotation of the shaft 15, the follower roller 24 will be laterally shifted first in one direction and then in the other by the coordinated inclines 19, 19a and 21, 21a in a manner which will be readily understood from Figs. VI and VII. Accordingly, the roller 24 will be obliged to alternately follow the concentric and eccentric groove portions 16, 16a of the cam disks 13, 13a and thereby determine alternate dwells and beats of the lay 10 during alternate rotations of the shaft 15. Attention is particularly directed to the fact that through the aforeindicated relative allocation of the inclines 21 and 21a of the cam disks 13, 13a, the pin 24 is engaged to equal extents by the groove portions 17, 17a of the cam disks as shown in Fig. VII at the precise moment when the lay is in its extreme forward position of its beat stroke, the strain being thereby equally divided between the two disks. My improved mechanical movement is obviously advantageous in that it determines quick and positive beats of the lay with amply long intervening dwell periods for passage of the shuttle through the reversing sheds successively formed by the warps during weaving, the beat strokes being devoid of abruptness by reason of the smoothness of the eccentric portions 17, 17a of the cam tracks and their gradual mergence with the concentric portions. It therefore follows that a loom fitted with the movement of my invention can be operated at very much higher speeds than possible with the usual crank type motions with attendant increase in production to a corresponding degree.

In the embodiment of my invention shown in Figs. VIII and IX, the rotary cam means is in the form of a single disk 13b with a continuous track having mergent short radius concentric and large radius eccentric curvature groove portions 16b, 17b respectively. The roller 24b which is adapted to follow the track groove of the disk 13b is in this case rotatable on a stud carried by the link 26b which connects with the lay sword 10b. The means here provided for shifting the roller 24b to cause it to alternately follow the concentric and eccentric portions 16b and 17b of the cam track includes another rotary cam 31 which is mounted on a shaft 32. This shaft 32 is suitably journalled at a level below the shaft 15b and driven from the latter through the medium of a pair of spur gears 33 and 34, the ratio of these gears being such that said shaft 32 makes one revolution to four of the shaft 15b. The side groove 35 of the cam 31 is engaged by a roller 36 at the pendant extremity of a lever 37 which is mounted to rock on a fixed stud 38 supported by the frame (not shown) of the loom. The upper extremity of the lever 37 is slotted at 40 to engage the stud 41 of the roller 24b. When the roller 36 on the lever 37 engages the low portion of the groove 35 in the cam 31 as in Fig. VIII it will be seen that the roller 24b on the link 26b will be obliged to follow the larger radius eccentric groove portion 17b of the cam disk 13b, thereby to impart a beat stroke to the lay. During the next rotation of the shaft 15b the cam 31 is turned through a quadrant by reason of the one to four ratio of the gears 33 and 34 and the lever 37 thereby swung rearward with attendant shifting of the roller 24b on the link 26b into the small radius concentric groove portion 16b of the cam disk 13b to retract the lay sword 10b. Thus here again, we have the quick but smooth actuation of the lay with relatively long dwell intervals between beats for passage of the shuttle exactly as in the first described embodiment of my invention.

Finally referring to the form of my invention shown in Figs. X—XVI, there is a cam disk 13c which is generally like the cam disk 13b of Figs. VIII and IX in that it affords, in itself, a continuous track or groove with mergent concentric and eccentric portions 16c and 17c for engagement by a roller 24c on the link 26c which connects with the member or element to be reciprocated, i. e. the lay sword 10c. The means here provided for determining alternate travel of the roller 24c in the concentric and eccentric groove portions 16c and 17c of the cam disk 13c includes a pair of switch tongues 42 and 43 which are rockable respectively about studs 44 and 45 on said cam disk, one of said switch tongues being illustrated in perspective in Fig. XV. These switch tongues 42 and 43 are respectively formed with arms 46 and 47 having at their ends lateral studs 48 and 49 which reach through openings 50 and 51 in the cam disk for connection by a link 52. The stud 48 it is to be especially observed from Figs. XII and XV is extended beyond the far side of the link 52 for capacity to engage either of the concentric grooves 54 and 55 of another disk 56 alongside the cam disk 13c. This second disk 56 is coaxial with the shaft 15c but fixedly secured to the frame of the loom, a fragment of which is shown at 57 in Fig. XII. Lodged in a cutout in the side face of the fixed disk 56 is a swingable semicircular switch segment 59 having an arcuate groove 60 that corresponds in width to that of the concentric grooves 54 and 55 of said fixed disk 56. The axis pin 61 of the switch segment 59 is journaled in the fixed cam disk 56 and extends beyond said disk and through the loom frame 57 to afford attachment for an arm 65, see Figs. XII—XIV. A roller 66 at the end of the arm 65 is adapted to be actuated by an elliptic cam 67 which is rotatably mounted on a fixed stud 68 projecting from the frame 57 of the loom. Secured to the elliptic cam 67 is the star wheel 69 of a Geneva motion whereof the pin disk 70 is secured to the shaft 15c. With the parts in the position shown in Fig. X, the roller 24c on the link 26c is travelling in the eccentric groove portion 17c of the cam disk 13c. As the rotation of the cam disk continues in the direction of the arrow in Fig. X, the stud 48 of the switch tongue 42 is transferred by the groove 60 of the switch segment 59, which at this time occupies the position shown in Figs. X and XIII, from the outer concentric groove 54 of the fixed disk 56 to the inner groove 55 of said disk. As a consequence, the switch tongue 42 and the link-connected switch tongue 43 are simultaneously swung from the position of Fig. X to that of Fig. XI, so that during the next rotation of the shaft 15c the roller 24c on the link 26c will leave the eccentric portion 17c of the cam groove and follow the concentric portion 16c as shown in Fig. XI. By the next actuation of the elliptic cam 67, the switch segment will be swung to the position shown in Fig. XI and the stud 48 thereby returned to the outer groove 54 of the stationary disk 56 to determine travel of the roller 24c once more in the eccentric portion 17c of the track groove in the cam disk 13c for execution of another beat stroke by the lay. The motion imparted to the lay is thus identical with that described in connection with the previous embodiments in that the lay is given quick beat strokes in alternation with quiescent dwell periods for passage of the shuttle.

From the foregoing illustrative examples, it will be evident that my improved mechanical movement is adapted for transmission of reciprocations to an actuated element or member during predetermined rotation of a continuously rotating shaft with provision for quiescent dwell periods for such element or member during intervening rotations of said shaft. It is further evident that this action is secured in all of the alternative embodiments which have been separately described irrespective of the direction in which the shaft is rotated, the movement being, in other words, reversible.

Having thus described my invention, I claim:

1. A mechanical movement comprising rotary cam means affording a track with mergent circular grooves, one within the other and respectively concentric and eccentric to the axis of rotation; a link pivotally connected to an element which is to be reciprocated and confined to endwise movement relative to the cam axis by virtue of a slotted connection with the latter and having a follower in engagement with the cam track; and means to cause the follower to alternately follow the concentric and eccentric curvatures of the cam track.

2. A mechanical movement comprising a pair of coaxial rotary disks with interrupted grooves jointly providing a continuous cam track with mergent curvatures concentric and eccentric to the axis of rotation; a follower with a connection to an element which is to be reciprocated; and means for shifting the follower first in one direction and then in the other laterally between the two cam disks so as to alternately follow the concentric and eccentric curvatures of the cam track.

3. A mechanical movement comprising a pair of coaxial rotary disks with interrupted grooves jointly providing a continuous cam track with mergent curvatures concentric and eccentric to the axis of rotation; a link pivotally connected to an element which is to be reciprocated and guided for endwise movement relative to the cam axis; a follower carried by the link with capacity to be shifted laterally first in one direction and then in the other by coordinated inclines in the grooves of the two disks whereby said follower is caused to alternately follow the concentric and eccentric curvatures of the cam track.

4. A mechanical movement comprising a pair of counterpart coaxial rotary disks placed face to face and each having a cam groove with mergent concentric and eccentric curvatures respectively vanishing into the side faces of the disks through coordinated inclines, said grooves being interrupted but jointly affording a continuous cam track; a link pivotally connected to an element which is to be reciprocated and guided for endwise movement relative to the cam axis; a follower carried by the link with capacity to be shifted laterally between the two cam disks first in one direction and then in the other by the coordinated inclines aforesaid whereby said follower is caused to alternately follow the concentric and eccentric curvatures of the cam track.

5. A mechanical movement comprising a rotary cam disk having a continuous track with mergent circular grooves, one within the other and respectively concentric and eccentric to the axis of rotation of the cam disk; a follower engaging the track and having connection with an element which is to be reciprocated; and means to cause the follower to alternately follow the concentric and eccentric curvatures of the cam track including a control cam disk coaxially mounted with the first mentioned cam disk.

6. A mechanical movement comprising a rotary cam disk having a continuous track with mergent curvatures concentric and eccentric to the axis of rotation; a link pivotally connected to an element which is to be reciprocated and confined to endwise movement relative to the cam axis by virtue of a slotted connection with said axis, said link having a follower in engagement with the cam track; and means to cause the follower to alternately follow the concentric and eccentric curvatures of the cam track including another rotary cam, a rocker arm with a follower to engage a groove in the last mentioned rotary cam and having a sliding connection with the follower on the link aforesaid.

7. A mechanical movement comprising a rotary cam disk having a continuous track with mergent curvatures concentric and eccentric to the axis of rotation; a follower engaging the track and having connection with an element which is to be reciprocated; switch means to cause the follower to alternately follow the concentric and eccentric curvatures of the cam track; and a control cam disk coaxially mounted with the first mentioned cam disk to control the switch means.

8. A mechanical movement comprising a rotary cam disk having a track with mergent curvatures concentric and eccentric to the axis of rotation; a follower engaging the track and having connections with an element which is to be reciprocated; pivoted switches carried by the cam disk; and a control cam disk coaxially mounted with the first mentioned cam disk for actuating the switches to cause the follower to alternately follow the concentric and eccentric curvatures of the cam track.

9. A mechanical movement comprising a rotary cam disk having a track with mergent curvatures concentric and eccentric to the axis of rotation; a follower engaging the track and having connection with an element which is to be reciprocated; a pair of link-connected pivoted switches on the cam; and a stationary cam disk with a groove operative upon a stud projection on one of the switches to automatically actuate said switches and thereby cause the follower to alternately follow the concentric and eccentric curvatures of the cam track.

10. A mechanical movement comprising a rotary cam disk having a track with mergent curvatures concentric and eccentric to the axis of rotation; a follower engaging the track and having connection with an element which is to be reciprocated; a pair of link connected pivoted switches on the disk; a stationary cam disk with two concentric grooves adapted to be engaged by a projection on one of the switches aforesaid; a pivoted switch segment on said stationary cam; and means for swinging said switch segment first in one direction and then in the other to determine shifting of the projection aforesaid from one to the other of the concentric tracks of the stationary cam, thereby to cause the follower to alternately follow the concentric and eccentric curvatures of the track in the rotary cam disk.

11. A mechanical movement comprising a rotary cam disk having a track with mergent curvatures concentric and eccentric to the axis of rotation; a follower engaging the track and having connection with an element which is to be reciprocated; a pair of link-connected pivoted switches on the disk; a stationary cam disk with concentric grooves adapted to be successively engaged by a projection on one of the switches; a pivoted switch segment on said stationary cam disk; and means for swinging said segment first in one direction and then in the other to determine shifting of the projection aforesaid from one to the other of the concentric tracks of the stationary cam and the switches to be reversed, thereby to cause the follower to alternately follow the concentric and eccentric curvatures of the track in the rotary cam disk, the aforementioned means including a Geneva motion with a star wheel actuated from the axis of the rotary cam, and a cam affixed to the star wheel and operative upon a lever connection with the switch segment.

12. A mechanical movement comprising a rotary cam having a continuous track with mergent curvatures concentric and eccentric to the axis of rotation of the cam; a link pivotally connected to an element which is to be reciprocated, said element being confined to endwise movement relative to the cam axis by virtue of a slotted connection therewith, and having a follower in engagement with the cam track; and means to cause the follower to alternately follow the concentric and eccentric curvatures of the cam track including another rotary cam, and interposed shifting means.

13. A mechanical movement comprising actuating means in the form of a pair of rotary cam disks coaxially mounted in spaced relation on a drive shaft, said disks having continuous tracks with mergent circular grooves, one within the other and respectively concentric and eccentric to the axis of rotation; and an actuated member confined to endwise reciprocatory movement in the interval between the two disks, said member carrying a follower adapted to alternately follow the mergent concentric and eccentric cam grooves in the two disks aforesaid during alternate rotations of the shaft.

14. A mechanical movement comprising actuating means in the form of a pair of rotary cam disks coaxially mounted in spaced relation on a drive shaft, said disks having continuous tracks with mergent circular grooves, one within the other and respectively concentric and eccentric to the axis of rotation; and an actuated link connected to a member which is to be reciprocated, said link being confined to endwise movement in the interval between the two disks by virtue of a slotted connection with the shaft, and carrying a follower adapted to alternately follow the mergent concentric and eccentric cam grooves in the disks during alternate rotations of the shaft.

15. A mechanical movement for actuating the lay of a loom, comprising rotary cam means affording a track with mergent circular grooves, one within the other and respectively concentric and eccentric to the axis of rotation; a link pivotally connected to the lay and confined to endwise movement relative to the cam axis by virtue of a slotted connection therewith, and having a follower in engagement with the cam track; and means to cause the follower to alternately follow the concentric and eccentric curvatures of the cam track.

16. A mechanical movement for actuating the lay of a loom, comprising a pair of actuating rotary cam disks coaxially mounted in spaced relation on a drive shaft, said disks having continuous tracks with mergent circular grooves, one within the other and respectively concentric and eccentric to the axis of rotation; and a link pivotally connected to the lay and confined to endwise movement in the interval between the two disks, said link carrying a follower adapted to alternately follow the mergent concentric and eccentric grooves in the disk during alternate rotations of the shaft.

17. A mechanical movement for actuating the lay of a loom, comprising a pair of coaxial rotary disks with interrupted grooves jointly providing a continuous cam track with mergent curvatures concentric and eccentric to the axis of rotation; a follower carried by a link connected to the lay; and means for shifting the follower first in one direction and then in the other laterally between the two cam disks, thereby to cause it alternately to follow the concentric and eccentric curvatures of the cam track.

18. A mechanical movement for actuating the lay of a loom, comprising a rotary cam having a continuous track with mergent curvatures concentric and eccentric to the axis of rotation of the cam; a link pivotally connected to the lay and guided for endwise movement relative to the cam axis by virtue of a slotted connection therewith, and having a follower in engagement with the cam track; and means to cause the follower to alternately follow the concentric and eccentric curvatures of said cam track including another rotary cam and an interposed shifting means between the latter cam and the link.

19. A mechanical movement for actuating the lay of a loom, comprising a rotary cam having a continuous track with mergent curvatures concentric and eccentric to the axis of rotation; a follower engaging the track and having connection with the lay; switch means to cause the follower to alternately follow the concentric and eccentric curvatures of the cam track; and a control cam disk coaxially with the first mentioned cam disk to control said switch means.

WILLIAM R. HEWTON.